United States Patent Office 3,024,225
Patented Mar. 6, 1962

3,024,225
POLYMERIZATION OF N-VINYLCARBAZOLE
Arthur S. Teot, Midland, Mich., assignor to The Dow Chemical Company, Midland, Mich., a corporation of Delaware
No Drawing. Filed Mar. 27, 1958, Ser. No. 724,273
4 Claims. (Cl. 260—88.1)

This invention concerns the preparation of addition polymers of N-vinylcarbazole, particularly homopolymers thereof and copolymers with ethylene. It particularly concerns the preparation of such polymers by polymerization of monomeric compositions comprising N-vinylcarbazole using certain complex coordination catalysts.

It is known from recent publications of Karl Ziegler and others to polymerize ethylene using complex heterogeneous solid catalyst systems, conveniently at low pressure and temperature, to produce polymeric products having a high degree of crystallinity, high density, and high molecular weight, and which are substantially linear, i.e. that have few branches and side chains. While the true structure of the active catalyst is still uncertain, it is known that polymerization-effective catalysts can be generated by interacting any of a very large number of combinations of two or more constituents selected from large classes of materials. In general, the complex catalysts, sometimes called "coordination complexes," can be prepared by combining, in the absence of oxygen, water carbon dioxide, and the like, and usually in the presence of an inert organic vehicle, (a) a compound of a transition metal selected from the "B" subgroups of groups IV, V and VI of the periodic arrangement of the elements, that is capable of existing in more than one valence state, and that is in one of its higher valence states, and (b) a strong reducing agent, particularly an organo-metal compound or metal hydride, capable of reducing the metal of compound (a) to one of its lower valences.

It is among the objects of this invention to provide polymers of N-vinylcarbazole.

A more particular object is to provide homopolymers of N-vinylcarbazole and copolymers of N-vinylcarbazole and ethylene.

Another object is to provide such polymers that have highly regular molecular structures as evidenced by high melting or softening points.

Another object is to prepare such polymers by polymerizing monomeric compositions comprising N-vinylcarbazole by using certain complex coordination catalysts.

Other objects and advantages of the invention will be apparent in the following description.

The objects of this invention have been attained by polymerizing N-vinylcarbazole, or mixtures thereof with ethylene, in contact with certain complex coordination catalysts as set forth in detail below.

The complex coordination catalysts with which this invention is concerned are obtained by combining (a) a halide, e.g. a fluoride, chloride, bromide or iodide, of titanium or vanadium in a valence greater than two and (b) an alkylaluminum compound. The halide (a) which is suitable for the present purposes can be, for example, titanium tetrachloride, titanium trichloride, titanium tetrabromide, titanium tribromide, vanadium tetrachloride, vanadium tetrabromide, and the like. The alkylaluminum compound (b) can be one corresponding to the formula wherein the symbol X represents a hydrogen atom, a halogen atom such as bromine or chlorine, or an R group, and the symbol R represents an alkyl group, there being no limit to the length or configuration of such alkyl group. Typical examples of suitable alkylaluminum compounds include alkylaluminum hydrides, alkylaluminum halides, and trialkylaluminums, such as isobutylaluminum dihydride, diisobutylaluminum hydride, ethylaluminum dichloride, diethylaluminum chloride, diethylaluminum bromide, trimethylaluminum, triethylaluminum, tripropylaluminum, triisobutylaluminum, trihexylaluminum, trioctylaluminum, tridodecylaluminum, and the like.

The active catalyst compositions for use in the present invention are prepared by mixing the alkylaluminum compound (b) and the titanium or vanadium halide (a), preferably in approximately stoichiometric proportions to obtain the desired degree of reaction with the titanium or vanadium compound, e.g. corresponding to reduction of the metal to a lower valence, such proportions being called the equivalent ratio. It will be understood that useful catalysts can be made from mixtures of the catalyst-forming starting materials in proportions other than the equivalent ratio but preferably not differing therefrom by a factor of less than 0.5 nor greater than 2. For catalysts prepared from trialkylaluminums such as triethylaluminum or triisobutylaluminum and titanium tetrachloride the starting materials are preferably employed in proportions corresponding to from 0.25 to four atom weights of aluminum per atom weight of titanium, commonly expressed as an aluminum:titanium ratio of from 0.25:1 to 4:1. For catalysts from other starting materials of the kinds previously described, the proportions of such starting materials can similarly be computed.

Usually the catalyst-forming starting materials are mixed in an inert liquid vehicle to be used subsequently as a medium for the polymerization reaction. By "inert liquid" is meant one which does not inactivate the catalyst for its intended purpose. Suitable inert liquids are hydrocarbons such as butane, pentane, hexane, heptane, octane, cyclohexane, and benzene. The resulting composition comprising the inert liquid and the active catalyst reaction product can be used per se as a medium for the polymerization reaction or the same can be added to a reaction medium containing the polymerizable starting materials. Alternatively, the catalyst-forming starting materials can be added directly to and mixed together in a reaction mixture containing the polymerizable starting materials whereby the active catalyst is generated in situ in the polymerizaiton reaction mixture.

It will be understood that the amount of catalyst employed in effecting polymerization in accordance with this invention can be varied over a wide range and depends upon the kind of catalyst, the nature of the polymerization system, the temperature and pressure maintained in the reaction zone, the duration and extent of contact of the catalyst with the polymerizable materials in the reaction zone, and the like. It is desirable to employ a quantity of catalyst that is at least large enough to sustain a reasonably rapid polymerization reaction for a reasonably long period of time. The preferred quantity is usually within the range of from 0.1 to 20 percent by weight of the transition metal, e.g. titanium, based on the monomeric materials that are to be polymerized.

The polymerization of N-vinylcarbazole using the complex coordination catalysts just described is carried out by bringing together in a polymerization reaction zone the catalyst composition and the N-vinylcarbazole with or without ethylene as the only polymerizable entities. Usually, the N-vinylcarbazole is diluted with a suitable inert liquid solvent of the kind described above, and placed in a reaction vessel. The catalyst composition is usually prepared separately as a dispersion in such an inert diluent, and the resulting catalyst composition is added to the N-vinylcarbazole in the reaction zone. When copolymers with ethylene are to be made, ethylene is also fed into the reaction mixture.

The polymerization of N-vinylcarbazole alone or together with ethylene as the only polymerizable entities can be carried out over a wide range of temperatures, e.g. from —20° C. and below to 100° C. and above. Low temperatures require the choice of low-melting liquid diluents, and high temperatures require the choice of high-boiling liquid diluents or the use of pressure or both. Temperatures appreciably above 250° C. are usually undesirable since the coordination complex catalysts are often unstable at such higher temperatures. These polymerizations can be carried out over a wide range of pressures above and below atmospheric pressure, there being no known limits except those dictated by practical considerations.

During the polymerization, the N-vinylcarbazole polymers usually precipitate from the reaction mixture forming a slurry of solid particles suspended in the liquid medium. At the conclusion of the polymerization reaction, the catalyst is usually inactivated by the addition of an agent such as an aliphatic alcohol, e.g. isopropanol, to the reaction mixture. The solid polymer can then be collected, e.g. by filtration, washed if desired, e.g. with aqueous washes, to extract catalyst metal residues, and dried.

The following examples illustrate the invention but are not to be construed as limiting its scope. The examples will also serve to describe the polymer products obtained in accordance with this invention.

*Example 1.—Homopolymerization of N-Vinylcarbazole*

In a series of seven runs, identified in Table 1, N-vinylcarbazole was polymerized in accordance with this invention. In each of these runs, N-vinylcarbazole and pure hexane were placed in a stirred reactor vessel. Portions of a solution of triisobutylaluminum and of titanium tetrachloride were combined in a mixing chamber outside of the reaction vessel, and the resulting catalyst mixture was added to the N-vinylcarbazole-hexane solution in the polymerization reactor. After 30 minutes of reaction time, a small amount of isopropanol was stirred into the resulting reaction mixture. The resulting solid-liquid slurry was filtered. The solid polymeric N-vinylcarbazole was washed with water and dried.

Table 1 shows, for each run, the taken amounts of N-vinylcarbazole, of hexane diluent, of triisobutylaluminum solution in hexane and its molar concentration, and of titanium tetrachloride solution in hexane and its molar concentration. The table also shows the reaction temperature and time for each run, and the yield, melting point, and nitrogen analysis (percent by weight as nitrogen) of the polymer product.

The table also shows, in Run No. 8, an attempted polymerization of N-vinylcarbazole in the presence of triisobutylaluminum only; no polymerization of N-vinylcarbazole was obtained.

The table also shows, in Run No. 9, a polymerization of N-vinylcarbazole in the presence of titanium tetrachloride only; while a polymer product was obtained in this instance, it will be seen that the melting point of that product was considerably lower than the melting points of the products obtained in Runs 1–7.

The solubility of poly(N-vinylcarbazole) made as in Runs 1–7 was measured at one percent by weight concentration in several liquids at room temperature as follows:

| Solvent | Solubility |
|---|---|
| Methyl ethyl ketone | Insoluble. |
| Toluene | Partially soluble, hazy. |
| Kerosene | Insoluble. |
| Pyridine | Soluble, clear. |
| Dimethylformamide | Partially soluble, hazy. |

The viscosities of solutions of the products of Runs 2 and 9 in Table 1 in toluene at ten percent by weight concentrations were determined in an Ostwald capillary viscometer, and molecular weights were calculated from these data as follows:

| Product of Run No. | Viscosity, centistokes | Molecular weight |
|---|---|---|
| 2 | 8.78 | 136,000 |
| 9 | 3.67 | 70,000 |

*Example 2.—Copolymerization of N-Vinylcarbazole and Ethylene*

In two runs, identified as Runs 10 and 11 in Table 2, N-vinylcarbazole was copolymerized with ethylene in accordance with this invention. In each run, pure hexane (the first named quantity in Table 2 under the caption "Inert Diluent, Hexane") was charged to the polymerization reactor. The N-vinylcarbazole (quantity taken as indicated in Table 2) was dissolved in pure hexane (the second named quantity in Table 2 under the caption "Inert Diluent, Hexane"), and the resulting solution was placed in a dropping funnel over the reactor vessel. Solutions of triisobutylaluminum and of titanium tetrachloride in hexane, in amounts and concentrations shown in Table 2, were taken and mixed in a separate mixing chamber to prepare the complex coordination catalyst. Ethylene gas was passed through the vapor space in the reactor vessel in excess, i.e. with constant venting during the subsequent reaction period. The N-vinylcarbazole solution and the catalyst complex were then fed concurrently to the reaction vessel over a 15-minute period. Table 2 shows the temperature of the reaction mixture during the reaction period. After a total time of 30 minutes, a small amount of isopropanol was added to the reaction mixtures, and the copolymer products were collected, washed with water, and dried. Table 2 shows the yield, melting point, and nitrogen analysis (in percent by weight as nitrogen) of the copolymer products. From these data, it appears that the copolymers of N-vinylcarbazole and ethylene obtained in Runs 10 and 11 contained, respectively, approximately 30 and 50 percent by weight of N-vinylcarbazole, the balance being ethylene. While advanta-

TABLE 1

| Run No. | N-vinylcarbazole, grams | Inert diluent, hexane, mls. | Catalyst composition, from solutions in hexane ||||  Reaction || Polymer product |||
|---|---|---|---|---|---|---|---|---|---|---|---|
| | | | Triisobutylaluminum || Titanium tetrachloride || Temp., °C. | Time, mins. | Yield, grams | Melt'g. point, °C. | Nitrogen analysis, percent |
| | | | Mls. | Molar conc'n | Mls. | Molar conc'n | | | | | |
| 1 | 5 | 100 | 10 | 0.1 | 10 | 0.1 | [1] RT | 30 | 4.1 | 260–310 | 6.44 |
| 2 | 5 | 100 | 10 | 0.2 | 10 | 0.1 | RT | 30 | 4.75 | 240–280 | 6.99 |
| 3 | 5 | 100 | 10 | 0.1 | 10 | 0.2 | RT | 30 | 4.7 | 260–310 | 6.97 |
| 4 | 5 | 100 | 10 | 0.1 | 10 | 0.1 | −17 | 30 | 4.14 | 260–310 | 6.84 |
| 5 | 5 | 100 | 10 | 0.1 | 10 | 0.1 | 69 | 30 | 4.34 | 240–260 | 6.78 |
| 6 | 3 | 300 | 30 | 0.1 | 30 | 0.1 | RT | 30 | 3 | 270–300 | 6.19 |
| 7 | 10 | 100 | 10 | 0.1 | 10 | 0.1 | RT | 30 | 9.1 | 310–330 | 6.67 |
| 8 | 5 | 100 | 20 | 0.1 | None | None | RT | 30 | | [2] | [2] |
| 9 | 5 | 100 | None | None | 20 | 0.1 | RT | 30 | 5 | 210–230 | 6.9 |

[1] Room temperature, approximately 25°C.  [2] No reaction.

geous copolymers are obtained over the entire range of proportions of N-vinylcarbazole to ethylene therein, polymers that contain at least 10, i.e. from 10 to 100, percent by weight of N-vinylcarbazole are especially preferred.

In place of a catalyst prepared from triisobutylaluminum and titanium tetrachloride as in the foregoing examples, there can be substituted another of the complex coordination catalysts hereinbefore described and obtained by reaction of an alkylaluminum compound and a halide of titanium or vanadium, and substantially the same results are obtained. Other inert liquid diluents as hereinbefore described can be substituted for the hexane. It will be evident to those skilled in the art how the invention can be practiced in other embodiments, including continuous manner.

weight of a complex coordination catalyst obtained by interaction of (a) a halide of a metal selected from the group consisting of titanium and vanadium in a valence greater than two and (b) an alkyl aluminum compound in amount from 0.5 to 2 times the stoichiometric amount corresponding to reduction of the valence of the metal in (a).

2. A method according to claim 1 wherein the complex coordination catalyst is prepared from (a) a tetrahalide of titanium and (b) a trialkylaluminum in amounts corresponding to from 0.25 to 4 atom weights of aluminum per atom weight of titanium.

3. A method according to claim 2 wherein the tetrahalide of titanium is titanium tetrachloride and the trialkylaluminum compound is triisobutyl aluminum.

TABLE 2

| Run No. | N-vinyl-carbazole, grams | Inert diluent, mls. | Catalyst composition, from solutions in hexane | | | | Reaction | | Polymer product | | |
|---|---|---|---|---|---|---|---|---|---|---|---|
| | | | Triisobutyl-aluminum | | Titanium tetrachloride | | Temp., °C. | Time, minutes | Yield, grams | Melt'g. point, °C. | Nitrogen analysis, percent |
| | | | Mls. | Molar conc'n. | Mls. | Molar conc'n. | | | | | |
| 10 | 12.5 | 100+150 | 25 | 0.1 | 25 | 0.1 | 15-48 | 30 | 28.3 | 240-250 | 2.51 |
| 11 | 20 | 300+200 | 30 | 0.2 | 30 | 0.2 | 45 | 30 | 35.6 | 255-270 | 3.54 |

The N-vinylcarbazole polymer products of this invention are solid, thermoplastic resins having unusually high heat distortion temperatures, heat stability, dielectric strength, and chemical resistance. They can readily be molded, e.g. by injection, at heat-plastifying temperatures into useful shapes, articles, and objects such as boxes, identification tags, and knife handles which derive advantage from the unusual properties of these N-vinylcarbazole polymers.

That which is claimed is:

1. A method for making polymers of N-vinylcarbazole which comprises polymerizing a monomeric composition containing as the only polymerizable entities from 10 to 100 parts by weight of N-vinylcarbazole and from 0 to 90 parts by weight of ethylene by contacting such monomeric composition with from 0.1 to 20 percent of its 4. A method according to claim 3 wherein the monomeric composition contains N-vinylcarbazole as the only polymerizable entity.

References Cited in the file of this patent

UNITED STATES PATENTS

| 2,832,759 | Nowlin | Apr. 29, 1958 |
| 2,846,427 | Findlay | Aug. 5, 1958 |
| 2,877,216 | Fikentscher et al. | Mar. 10, 1959 |

FOREIGN PATENTS

| 706,412 | Great Britain | Mar. 31, 1954 |
| 739,438 | Great Britain | Oct. 26, 1955 |

OTHER REFERENCES

Shine: Polyvinyl Carbazole Resin, Modern Plastics, p. 130–132, 216, 218, 220 (September 1947).